Oct. 26, 1926.
A. C. McNULTY
1,604,590
SUPPORTING DEVICE
Filed Feb. 23, 1923
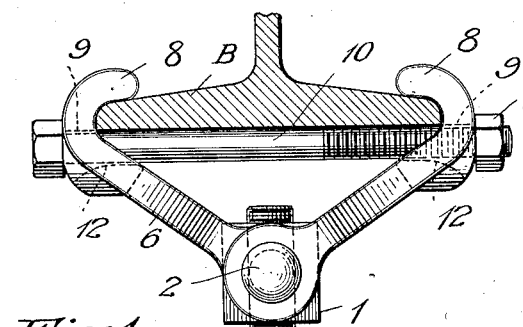
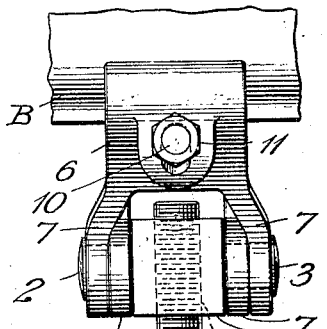
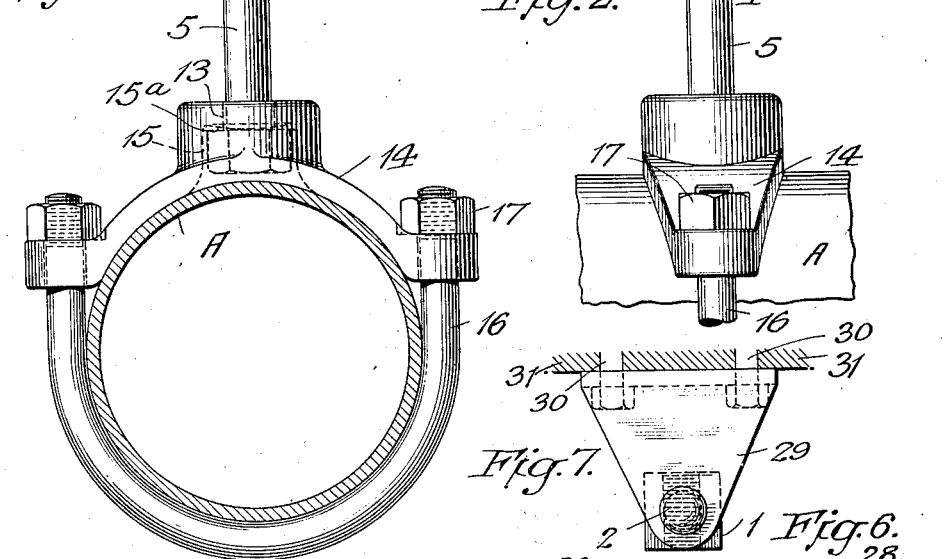
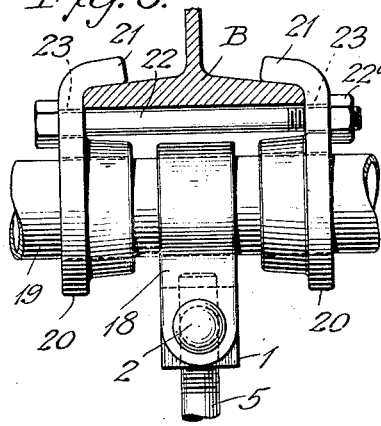
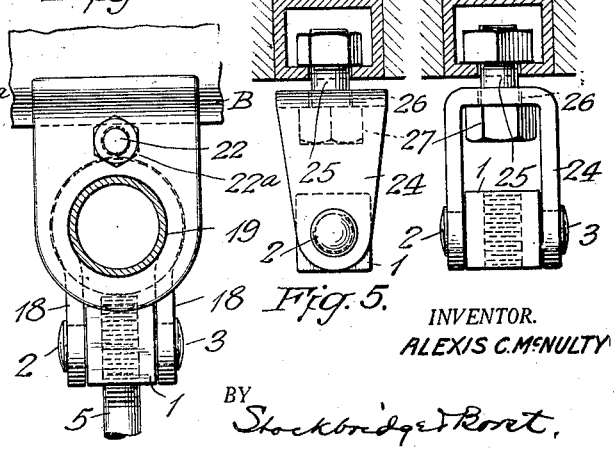
INVENTOR.
ALEXIS C. McNULTY
BY Stockbridge & Borst,
ATTORNEYS Patented Oct. 26, 1926.

1,604,590

UNITED STATES PATENT OFFICE.

ALEXIS C. McNULTY, OF RUTHERFORD, NEW JERSEY.

SUPPORTING DEVICE.

Application filed February 23, 1922. Serial No. 620,623.

This invention relates to supporting devices, such as may be used for the support of pipes, cables and the like, and has for an object to provide an improved device which may be used to compensate for contraction and expansion of articles that may be supported at intervals by such devices; with which a limited swinging movement of the article to be supported may be permitted; with which the article to be supported may be adjusted in a simple and convenient manner toward and from the main support, even after the article is entirely supported thereby; which may be adjusted for attachment to beams and other supports of different sizes; and which is strong, durable, simple and inexpensive. Other objects and advantages will be apparent from the following description of an embodiment of the invention and the novel features will be particularly pointed out in claims.

In the accompanying drawing:

Fig. 1 is an elevation partly in section of a pipe supported from an I-beam by a supporting device constructed in accordance with the invention;

Fig. 2 is a side elevation of the same;

Fig. 3 is an elevation of a portion of a modified supporting device;

Fig. 4 is a side elevation of the same;

Fig. 5 is an elevation of a further modification of the supporting device;

Fig. 6 is a side elevation of the same, and

Fig. 7 is an elevation of a still further modification of the device.

Referring particularly to Figures 1 and 2 in which a pipe A is to be supported from an I-beam B, a block 1 is provided with trunnions 2 and 3 extending in alignment from opposite faces of the block. The block is provided with a threaded aperture 4, extending therethrough at right angles to the common axis of the trunnions for the reception of the threaded end of a rod or bolt 5. A pair of jaws 6 are bifurcated, each at one end, so as to provide parallel arms or branches 7, and these arms 7 embrace the block 1 and have aligned apertures through which the trunnions 2 and 3 extend and in which they rotate. The arms 7 in effect constitute a hinged connection between the jaws and the trunnions of the block. The jaws 6 are thus capable of rotating independently of one another upon the trunnions, so as to be free to move toward or from one another at their free ends. The free ends 8 are preferably hook shaped, with the hooks turned toward one another so that they may embrace and engage over the head of an I-beam and grip the same.

Each jaw 6 intermediate of its ends is provided with an aperture 9, and a bolt 10 having an adjustable nut 11 passes through the apertures 9 of the jaws in a manner to clamp them together and to the beam, and to prevent their disengagement therefrom. The portion of the wall or surface of each of the apertures 9 on the side toward the block 1 is preferably made convex, as at 12, so that when the jaws move toward one another the bolt 10 will rock upon the convex wall and be lifted thereby to a limited extent. The thickness of flange or head of standard I-beams and the like varies with the dimensions of the beam, the thickness of the flange or head of a beam decreasing with a decrease in other dimensions. When the jaws embrace and engage the head of an I-beam, the hooked or flanged ends 8 will fit over and rest upon the upper surface of the head and the bolt 10 will pass beneath the head but in close proximity thereto. If the jaws are brought together to embrace a smaller beam, the bolt 10 will rock upon the convex surface 12 and be carried upwardly to a limited extent and fit closely beneath the head of the I-beam to which the jaws are secured. If the jaws are separated to embrace a larger beam, the bolt will rock upon the convex surfaces 12 of the apertures 9 and descend sufficiently to compensate for the increased thickness of head of that size of beam and still lie in close proximity thereto.

The bolt or rod 5 is preferably headed at its lower end and passes upwardly through an aperture 13 in an arm 14. The head of the rod or bolt 5 is preferably counter-sunk into the recess 15 in the under face of the arm 14. The bottom wall 15ª of the recess is preferably made somewhat convex so that a limited rocking of the bolt in the arm 14 is possible. This constitutes in effect a universal joint connection. The ends of the arm 14 are apertured and the under face of the arm is concave. A U-shaped strap 16 embraces the pipe A from beneath, with the arms of the strap passing upwardly through the apertures in the ends of the arm 14. Nuts 17 are threaded upon the projecting ends of the strap 16 so as to pull the strap through the aperture to various extents and thus clamp the pipe A against the lower concave face of the arm 14. The recess 15 is sufficiently large to permit rotation therein of the head of the bolt or rod 5, and consequently when the latter is rotated, it will by reason of its threaded engagement with the block 1, be shifted upwardly or downwardly dependent upon its direction or rotation. The block 1 thus in effect acts as a nut for the rod or bolt 5.

The bolt 5 and the pipe A supported therewith will be capable of a limited swinging movement with the nut or block 1 about the axis of the trunnions. If the pipe and beam run in the same direction, this swinging movement will be laterally of the pipe and will provide some compensation for small lateral deviations of the beam from a straight or other definite path. If the pipe A runs transversely of the length of the I-beam or other support, the swinging movement will be in a direction endwise of the pipe so as to vary automatically with contractions and expansions in the pipe or beam due to changes in temperature. By rotating the rod 5, the pipe may be adjusted toward or from the beam or support, so that the pipe may be given any desired inclination or level. The rod or bolt 5 may be rotated in a simple manner by the well known pipe or "Stilson" wrench.

Referring particularly to Figures 3 and 4, a pipe (not shown) similar to pipe A, is supported through the bolt 5 which passes through and has threaded engagement with the nut or block 1. In this embodiment of the invention I utilize a U-shaped strap 18 which passes downwardly over a supporting pipe or rod 19. The trunnions 2 and 3 of the nut or block pass through and rotate in aligned apertures in the depending arms of the strap 18, so as to form a pivotal connection between the block or nut and the strap. Sleeves 20 are adjustable upon the rod or pipe 19 lengthwise thereof and have flanges or hooks 21 which are turned toward one another in order to hook over the upper surface of the head of a suitable support such as an I-beam B. A bolt 22, having a nut 22ª, passes through apertures 23 in the sleeves 20 so as to clamp the sleeves to opposite edges of the head of the I-beam. By adjusting the nut 22ª, the sleeves can be adjusted toward or from one another so as to embrace and grip I-beams of different sizes. The pipe 19 may be supported at suitable points from spaced I-beams by the sleeves 20, and at points intermediate those points of support the strap 18 and the parts supported thereby may be attached to the pipe 19, so as to provide a support for the pipe A at distances less than the distance between beams.

Referring particularly to Figures 5 and 6 the nut or block 1 is disposed between the arms of a U-shaped strap 24, with the trunnions 2 and 3 of the nut or block passing through and rotating in apertures in the outer ends of the arms of the strap 24. A bolt 25 passes through an aperture 26 in the cross arm of the strap 24, with the head 27 of the bolt disposed between the arms of the strap. The bolt or screw 25 may be attached by means of its threads to any suitable supporting object 28. In this embodiment of the invention, the bolt or screw 25 may be rotated in order to shift the parts supported thereby toward or from the supporting object 28, and at the same time the strap and parts carried thereby are free to rotate upon the head 27 thereof. Inasmuch as the bolt 5 may be adjusted upwardly and downwardly in the nut 1, there will be little occasion for the adjustment of the bolt 25, and therefore the latter may if desired be secured permanently to the supporting object 28.

In Fig. 7 the nut or block 1 is rotated, supported by its trunnions from a U-shaped strap 29, but the cross arm of the strap is sufficiently wide to enable screws 30 to be passed therethrough into the supporting surface 31 and at the same time clear the nut or bolt 1.

With this type of supporting device the use of a turn buckle for forming the adjustable feature of a suspension support is unnecessary, and the device may be attached to supporting beams or objects of different sizes. The oscillation of the nut or block about the axis of its trunnions provides for a limited swinging movement of the article supported so as to facilitate alignment or leveling of the latter, or perhaps expansion or contraction of the pipe. It will be observed that the adjustment of the pipe toward and from the support may be accomplished after the article is entirely supported by the device. The device may be made of any suitable material, such as malleable iron or annealed steel, and the outer ends of the trunnions may be upset or peened to prevent any likelihood of the separation of the jaw arms therefrom. While I have described the invention as used to support pipes, it will be understood that it is applicable equally well to the support of other articles or objects.

It will be obvious that various changes in the details and arrangements of parts herein described and illustrated for the purpose of explaining the nature of the invention, may be made by those skilled in the art within the principle and scope of the invention as expressed in the appended claims.

I claim:

1. A supporting device comprising a nut having aligned trunnions extending from two opposite faces thereof, clamping members separately hinged to the trunnions so as to swing toward and from one another and embrace a support therefor, whereby the nut will be free to oscillate on the axis of its trunnions, a rod in threaded engagement with the nut and extending therefrom, and means carried by the extending end of the rod for attachment to the object to be supported.

2. A supporting device comprising a nut having aligned trunnions extending from two opposite faces thereof, clamping members separately hinged to the trunnions so as to swing toward and from one another and grip a support therefor, whereby the nut will be free to oscillate on the axis of its trunnions, a rod in threaded engagement with the nut and extending therefrom, and means for adjustably forcing the clamping members toward one another to grip supports of different sizes.

3. A supporting device comprising a nut having aligned trunnions extending from two opposite faces thereof, a pair of jaws, each having one end bifurcated with aligned apertures in the arms thereof and the other end hook-shaped to engage an object from which it is to be supported, each bifurcated end embracing the nut with the trunnions of the latter passing through the aligned apertures whereby the nut and jaws are articulately connected one to another for movement about the axis of the trunnions, adjustable means connecting the jaws at points distant from the nut trunnions whereby relative movement between the hooked ends of the jaws from any adjusted position in engagement with said object may be prevented and means attachable to the object to be supported, having a rod in threaded engagement with said nut, whereby the said last named means and object carried thereby can be adjusted toward and from the object to which the jaws are attached and at the same time can have an oscillatory movement with the nut about the axis of the trunnions.

4. A supporting device comprising a nut having aligned trunnions extending from two opposite faces thereof, a pair of jaws, each having one end bifurcated with aligned apertures in the arms thereof and the other end hook-shaped to engage an object from which it is to be supported, each bifurcated end embracing the nut with the trunnions of the latter passing through the aligned apertures whereby the nut and jaws are articulately connected one to another for movement about the axis of the trunnions, a bolt passing freely through said jaws and adjustable to clamp the hooked ends of the jaws to said object, and means attachable to the object to be supported, having a rod in threaded engagement with said nut, whereby the said last named means and object carried thereby can be adjusted toward and from the object to which the jaws are attached and at the same time can have an oscillatory movement with the nut about the axis of the trunnions.

5. A supporting device comprising a block having aligned trunnions extending from two opposite sides thereof, members articulately connected to said trunnions so as to swing thereon to embrace and clamp a support, a bolt device passing through and adjustably drawing said members together to grip various size supports, and means to which the object to be supported may be secured, carried by the block for swinging movement therewith about the axis of the trunnions.

6. A supporting device comprising a block having aligned trunnions extending from two opposite sides thereof, a pair of jaws both hinged upon both of said trunnions for movement thereon to carry their free ends toward and from one another and having provision at their free ends for engagement with a support, means adjustably connecting said jaws at some distance from the trunnions, and means connected to said block for supporting an object therefrom.

7. A supporting device comprising a block having aligned trunnions extending from two opposite sides thereof, a pair of jaws both hinged upon said trunnions for movement thereon to carry their free ends toward and from one another and having provision at their free ends for engagement with a support, a bolt passing through and adjustably connecting said jaws intermediate of their ends, and means connected to said block for supporting an object therefrom.

8. A supporting device comprising a block having aligned trunnions extending from two opposite sides thereof, a pair of jaws both hinged upon both of said trunnions for movement thereon to carry their free ends toward and from one another and having provision at their free ends for engagement with a support, said jaws each having an aperture therein intermediate of their ends with the wall of each aperture on the side toward the trunnions convex, a bolt passing through said apertures and adjustably connecting said jaws, whereby the bolt will rock on the convex surfaces and be shifted away from the trunnions slightly, when the jaws are brought toward one another.

In witness whereof, I hereunto subscribe my signature.

ALEXIS C. McNULTY.